(12) United States Patent
Pang et al.

(10) Patent No.: US 8,804,359 B2
(45) Date of Patent: Aug. 12, 2014

(54) MOUNTING DEVICE FOR RISER CARD

(75) Inventors: Wei Pang, Shenzhen (CN); Al-Ling He, Shenzhen (CN); Jun-Hui Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 114 days.

(21) Appl. No.: 13/557,289

(22) Filed: Jul. 25, 2012

(65) Prior Publication Data
US 2013/0335911 A1 Dec. 19, 2013

(30) Foreign Application Priority Data
Jun. 19, 2012 (CN) .......................... 2012 1 02027230

(51) Int. Cl.
*H05K 7/00* (2006.01)

(52) U.S. Cl.
USPC .......................................... 361/760; 361/787

(58) Field of Classification Search
USPC ............ 361/679.31, 679.32, 679.4, 697, 737, 361/740, 748, 759, 760, 784, 791
See application file for complete search history.

(56) References Cited

U.S. PATENT DOCUMENTS

| 8,625,258 B2 * | 1/2014 | Li ............................. 361/679.01 |
| 2005/0111203 A1 * | 5/2005 | Bassett et al. .................. 361/755 |
| 2013/0148286 A1 * | 6/2013 | Liu et al. .................. 361/679.32 |
| 2013/0163215 A1 * | 6/2013 | Sun ............................... 361/759 |

* cited by examiner

*Primary Examiner* — Tremesha S Willis
(74) *Attorney, Agent, or Firm* — Novak Druce Connolly Bove + Quigg LLP

(57) ABSTRACT

A device for mounting a riser card includes a base board forming two rods, a motherboard forming an expansion slot to connect the riser card, and a fixing member having two legs at opposite ends. The rods extend through the motherboard and are positioned at opposite ends of the expansion slot. Each rod contains a resilient member inside, and a ball mounted to the resilient member and partly extending out of the rod. The riser card is fixed to the fixing member. Each leg defines a cylindrical hole fitted about one of the rods. The balls partly extend out of the corresponding rods and block tops of the corresponding legs.

8 Claims, 5 Drawing Sheets

MOUNTING DEVICE FOR RISER CARD

CROSS-REFERENCE TO RELATED APPLICATION

Relevant subject matter is disclosed in a pending U.S. patent application, titled "MOUNTING DEVICE FOR CONNECTOR", filed on Jul. 20, 2012, with the application Ser. No. 13/554,118, which is assigned to the same assignee as this patent application.

BACKGROUND

1. Technical Field

The present disclosure relates to a device for mounting a riser card.

2. Description of Related Art

Riser cards each is provided to be connected between a motherboard and a hard disk drive (HDD) or an expansion card. Generally, an edge connector of each riser card is inserted into an expansion slot mounted on the motherboard, to fix the riser card to the motherboard. However, the edge connector may be disengaged from the expansion slot easily in transportation or in a vibration test. As a result, signal transmission between the motherboard and the HDD or the expansion card will be intermitted. Furthermore, the edge connector of the riser card may be destroyed.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
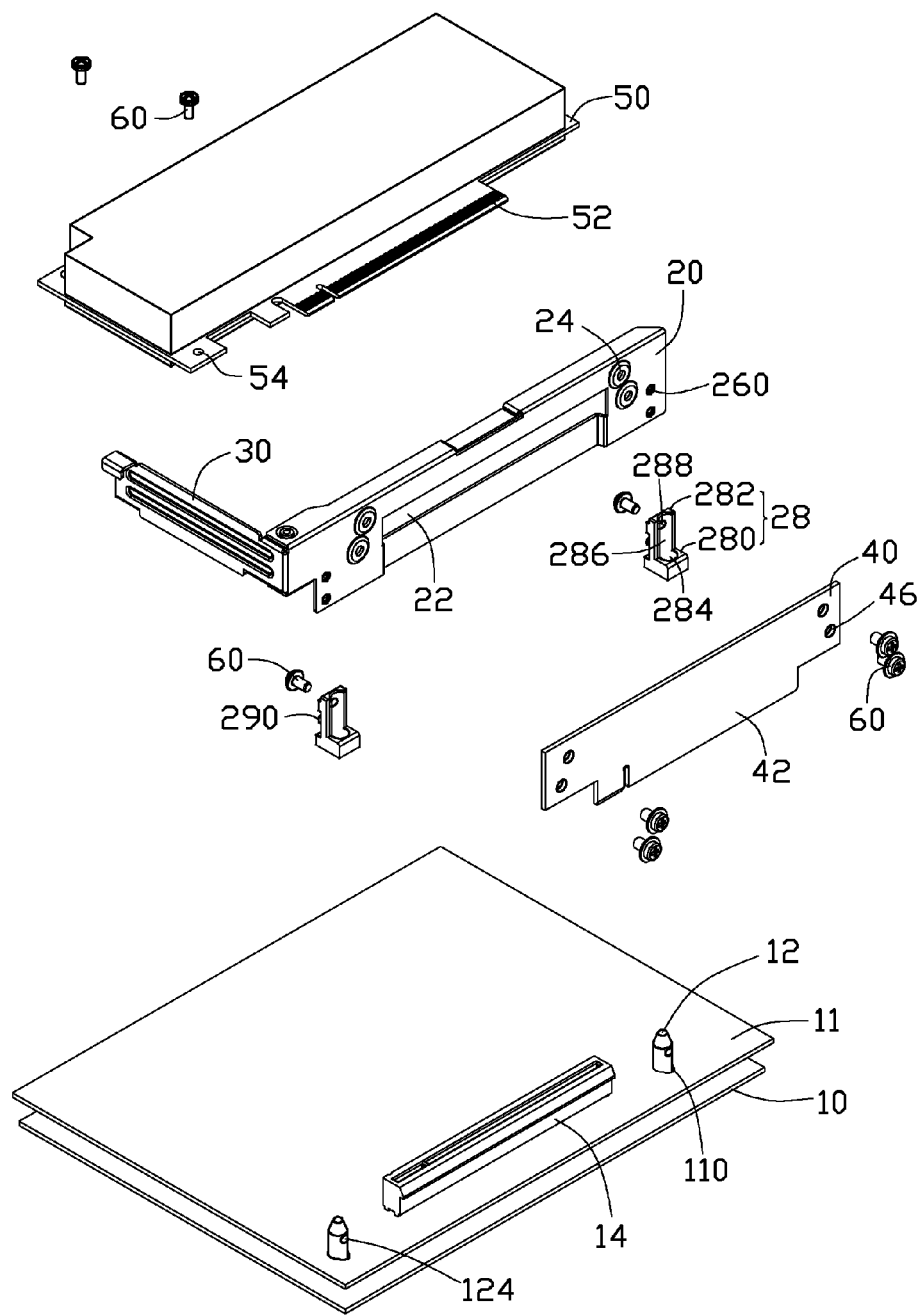
FIG. 1 is an exploded, isometric view of an exemplary embodiment of a mounting device, together with a riser card and an expansion card.
Figure 5:
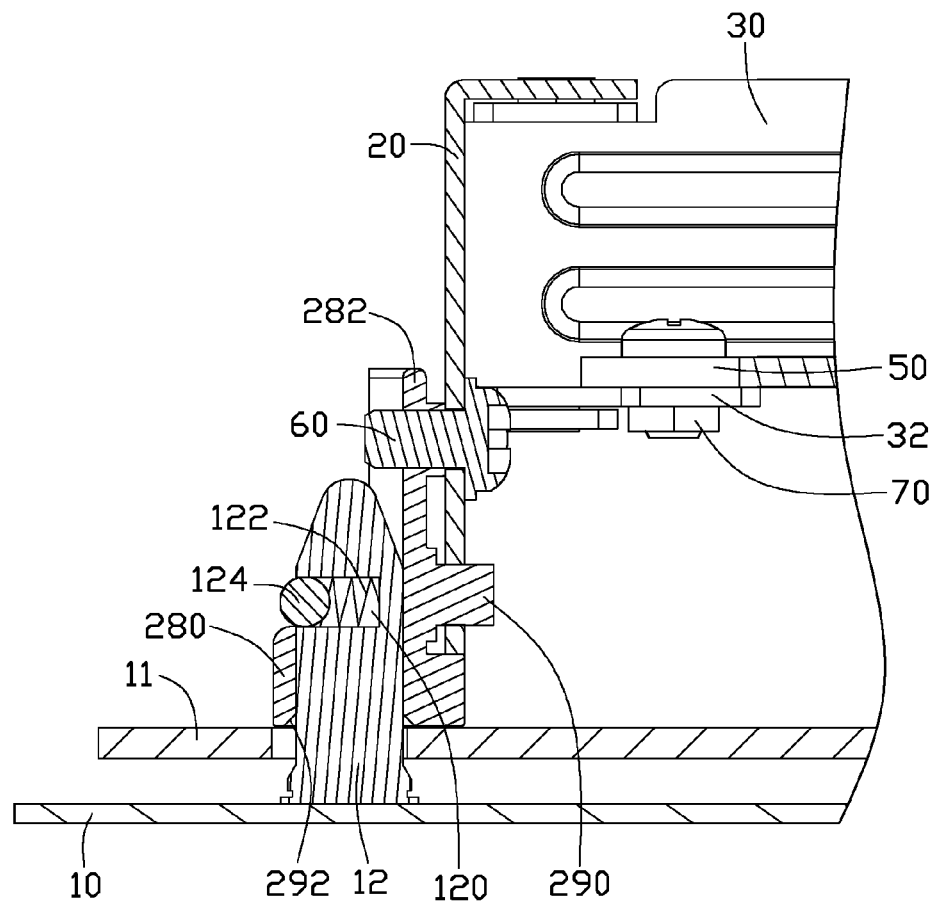
FIG. 5 is a sectional view of FIG. 4, taken along the line V-V.

Referring to FIGS. 1 and 5, an exemplary embodiment of a mounting device is provided for mounting a riser card 40 which is electrically connected to an expansion card 50 or a hard disk drive. The mounting device includes a base board 10 of a chassis, an elongated fixing member 20, an extension member 30 extending rearward from one of opposite ends of the fixing member 20, and two legs 28 mounted to lower portions of the opposite ends of the fixing member 20.

A motherboard 11 is mounted on the base board 10 and defines two first through holes 110. A first expansion slot 14 is mounted on the motherboard 11. Two rods 12 each having a tapered top end protrudes from the base board 10, and are capable of extending through the first through holes 110 of the motherboard 11, respectively. The rods 12 are positioned at opposite ends of the first expansion slot 14.

Each rod 12 defines a receiving hole 120 having a blind end and adjacent to a top end of the rod 12. The receiving hole 120 extends through a circumference of the rod 12. A resilient member 122 is received in the receiving hole 120, with a first end of the resilient member 122 abutting the blind end of the receiving hole 120. A ball 124 is fixed to a second end of the resilient member 122 opposite to the first end. The ball 124 is partly extended out of the rod 12. In the embodiment, the resilient member 122 is a spring.

The fixing member 20 longitudinally defines an elongated slot 22, and two engaging holes 24 adjacent to each of the opposite ends of the slot 22. Two positioning holes 260 are defined in a lower portion of each of the opposite ends of the fixing member 20.

Each leg 28 includes a base 280 and a holding piece 282, perpendicularly extending up from a rear end of a top of the base 280. The base 280 defines a cylindrical hole 284 extending through the top of the base 280, and a tapered hole 292 extending through a bottom of the base 280 and communicating with the cylindrical hole 284 with a small end. The holding piece 282 defines a receiving slot 286 having a substantially C-shaped cross-section and communicating with the cylindrical hole 284. A threaded hole 288 is defined in an upper portion of a bottom wall of the receiving slot 286 and extends through a rear surface of the holding piece 282, opposite to the receiving slot 286. A pin 290 protrudes from the rear surface of the holding piece 282.

A first edge connector 42 extends down from a bottom side of the riser card 40. A second expansion slot 44 (shown in FIG. 3) protrudes from a rear surface of the riser card 40. Two second through holes 46 are defined in each of opposite ends of the riser card 40.

Figure 3:
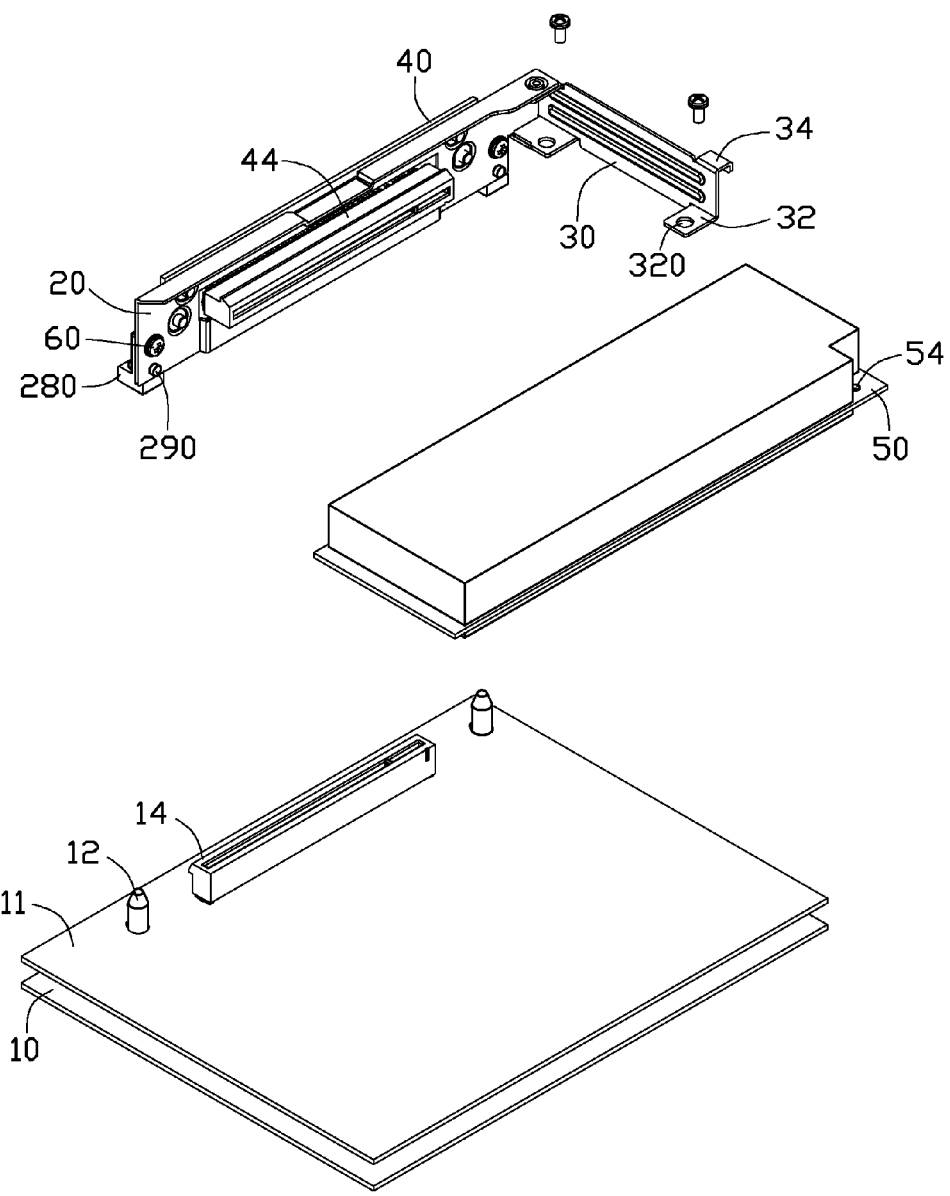
FIG. 3 is similar to FIG. 2, but viewed from another perspective.

Referring to FIG. 3, two tabs 32 perpendicularly extend inward from a bottom side of the extension member 30. Each tab 32 defines a fixing hole 320. An L-shaped latch 34 perpendicularly extends out from a top of the extension member 30 away from the tab 32.

A second edge connector 52 extends from a side of the expansion card 50. Two installing holes 54 are defined in an end of the expansion card 50.

Figure 2:
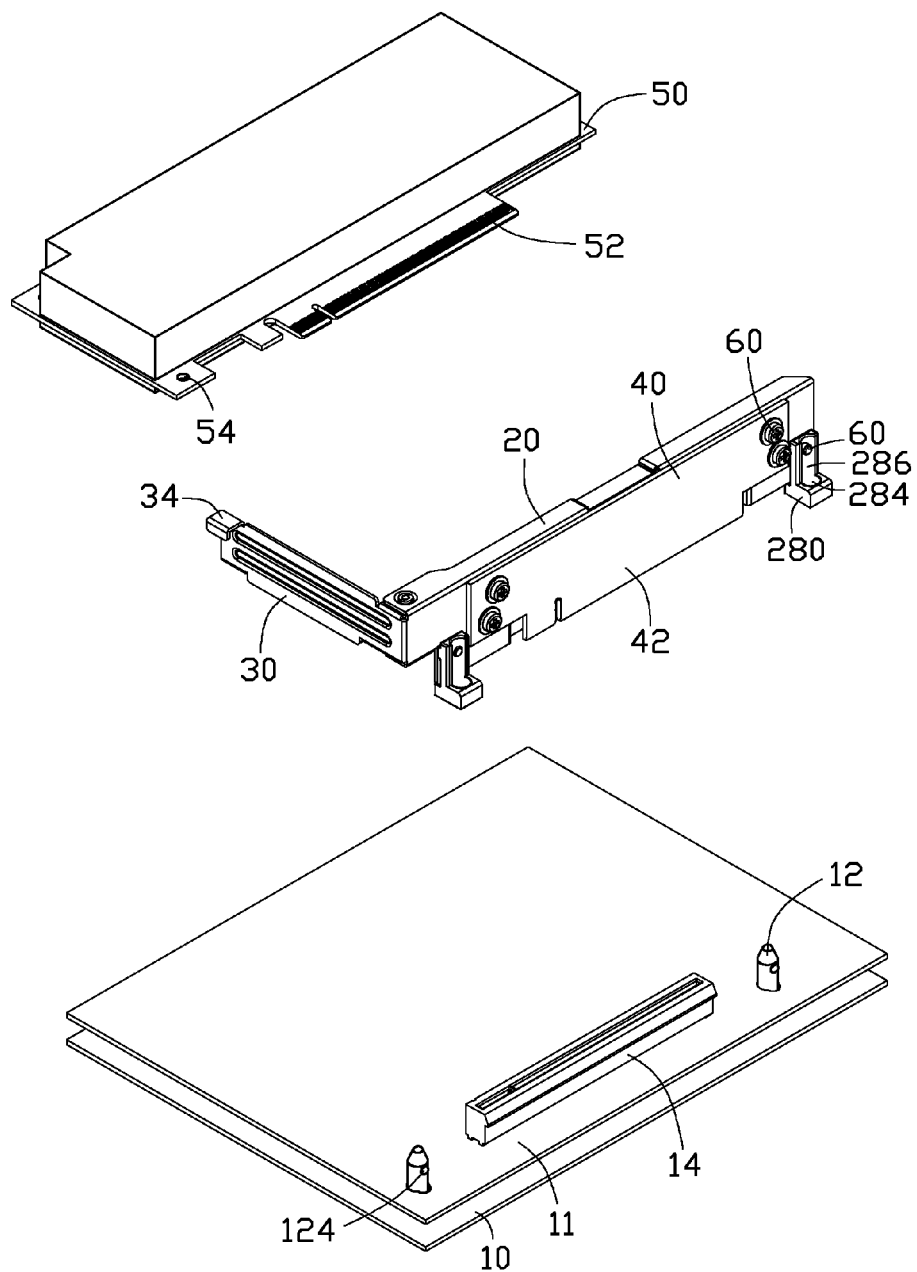
FIG. 2 is a partly assembled, isometric view of FIG. 1.

Referring to FIGS. 2 and 3, in mounting each leg 28 to the fixing member 20, the pin 290 is engaged in a lower one of the positioning holes 260 of a corresponding end of the fixing member 20, to position the leg 28 at the end of the fixing member 20. The threaded hole 288 is aligned with an upper one of the positioning holes 260. A screw 60 extends through the upper positioning hole 260 and is engaged in the threaded hole 288, to fix the leg 28 to the end of the fixing member 20. The fixing member 20 is supported on rear parts of the bases 280 opposite to the cylindrical holes 284.

Figure 4:
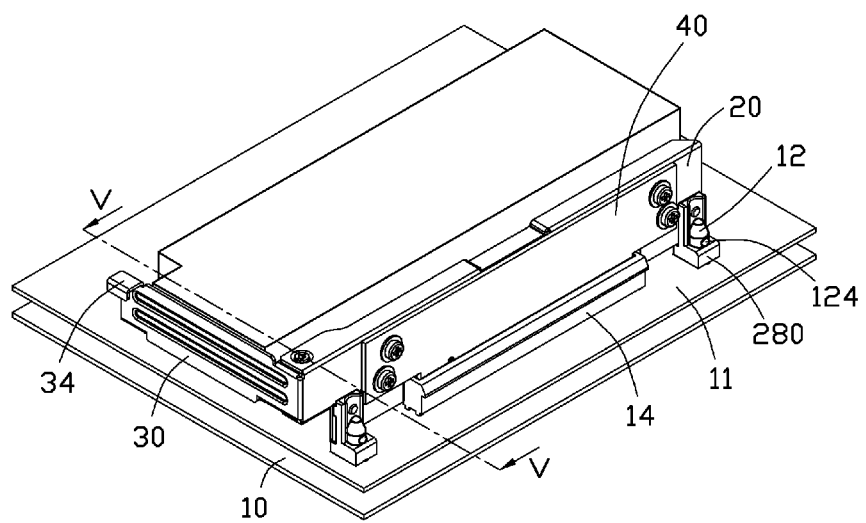
FIG. 4 is an assembled, isometric view of FIG. 1.

Referring to FIGS. 4 and 5, in assembly, the second expansion slot 44 is extended through the slot 22. Four screws 60 extend through the second through holes 46 and then are engaged in the corresponding engaging holes 24, to fix the riser card 40 to a front surface of the fixing member 20 opposite to the extension member 30. The second edge connector 52 is inserted into the second expansion slot 44. Two screws 60 extend through the installing holes 54 and the corresponding fixing holes 320 and then are respectively engaged with two nuts 70, to fix the expansion card 50 to the extension member 30.

The first edge connector 42 is aligned with the first expansion slot 14. The tapered holes 292 are aligned with the rods 12, thereby the rods 12 may extend into the corresponding cylindrical holes 284 easily. Each ball 124 is pressed by an inner surface bounding a corresponding one of the cylindrical holes 284 and withdraws into the corresponding receiving hole 120. The resilient members 122 are deformed. When the balls 124 are received in the corresponding receiving holes 120 completely, the bases 280 contact the motherboard 11. The first edge connector 42 is inserted into the first expansion slot 14. The resilient members 122 are then restored and bias the corresponding balls 124 to partly extend out of the corresponding rods 12 to block tops of the corresponding bases 280, thereby fixing the fixing member 20 to the motherboard 11. The latch 34 may be fixed to a sidewall (not shown) of the chassis perpendicularly connected to the base board 10.

In uninstalling the riser card 40, the latch 34 is disengaged from the sidewall. The balls 124 are pressed to be completely received in the corresponding receiving holes 120. The fixing member 20 is then readily to be taken up. The rods 12 disengage from the corresponding cylindrical holes 284, and the first edge connector 42 disengages from the first expansion slot 14. The screws 60 for mounting the expansion card 50 to the tabs 32 are released first, and the second edge connector 52 is disengaged from the expansion slot. The screws 60 for mounting the riser card 40 to the fixing member 20 are then readily to be released.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for mounting a riser card, the mounting device comprising:
a base board comprising two rods each defining a receiving hole having a blind end, a resilient member received in the receiving hole and having a first end abutting the blind end of the receiving hole, and a ball connects to a second end of the resilient member and partly extends out of the circumference of the rod;
a motherboard mounted on the base board and forming a first expansion slot for connecting the riser card;
a fixing member for fixing the riser card; and
two legs mounted to opposite ends of the fixing member, each leg comprising a base defining a cylindrical hole;
wherein the rods extend through the motherboard and are positioned at opposite ends of the first expansion slot, the cylindrical holes are fitted about the rods, the balls partly extend out of the corresponding rods and block tops of the corresponding bases.

2. The mounting device of claim 1, wherein the fixing member defines a first positioning hole in each of opposite ends, each leg further comprises a holding piece perpendicularly extending up from the base and defining a threaded hole, two screws extend through the first positioning holes and are engaged in the corresponding threaded holes, to fix the legs to the opposite ends of the fixing member.

3. The mounting device of claim 2, wherein the fixing member defines a second positioning hole in each of the opposite ends, a pin extends from a side of the holding piece of each leg to engage in a corresponding one of the second positioning holes.

4. The mounting device of claim 2, wherein the holding piece of each leg defines a receiving slot having a substantially C-shaped cross-section, and a bottom of the receiving slot opens into the corresponding cylindrical hole.

5. The mounting device of claim 1, wherein the fixing member is supported on rear parts of the bases opposite to the cylindrical holes.

6. The mounting device of claim 1, wherein the fixing member defines a slot through which a second expansion slot of the riser card extends and an engaging hole adjacent to each of opposite ends of the slot, two screws are extended through the riser card to be respectively engaged in the engaging holes to fix the riser card to the fixing member.

7. The mounting device of claim 1, wherein an extension member perpendicularly extends from one of opposite ends of the fixing member, at least a tab perpendicularly extends from the extension member to support an end of an electronic device connected to the riser card.

8. The mounting device of claim 1, wherein the resilient member is a spring.

* * * * *